United States Patent [19]
West

[11] Patent Number: 5,715,712
[45] Date of Patent: Feb. 10, 1998

[54] VEHICLE DOOR SAFETY AND THEFT RESISTANT LOCK

[76] Inventor: Marlon West, 5307 Sepulveda Blvd., #303, Sherman Oaks, Calif. 91411

[21] Appl. No.: 656,916

[22] Filed: Jun. 3, 1996

[51] Int. Cl.⁶ .............................. B60R 25/04; E05B 65/12
[52] U.S. Cl. .............................. 70/257; 292/144
[58] Field of Search .............................. 292/144; 70/257, 70/278

[56] References Cited

U.S. PATENT DOCUMENTS

| | | | |
|---|---|---|---|
| 3,360,970 | 1/1968 | Hays | 292/144 |
| 3,396,999 | 8/1968 | Knapp | 292/144 |
| 4,372,419 | 2/1983 | Barnett | 292/144 |
| 5,263,347 | 11/1993 | Allbaugh | 292/144 |
| 5,386,713 | 2/1995 | Wilson | 292/144 |

FOREIGN PATENT DOCUMENTS 1275823  10/1961  Italy ........................... 292/144

*Primary Examiner*—Flemming Saether
*Attorney, Agent, or Firm*—Roy A. Ekstrand

[57] ABSTRACT

A bolt actuator is supported within a vehicle to move a dead bolt between a withdrawn or open position and an extending or locked position in response to an applied switch condition. A lock plate defining a center bore and a guide defining a similar center bore are supported in alignment between a movable vehicle door and a fixed or stationary portion of the vehicle chassis or body. The bolt actuator slides the bolt through the guide and lock plate to provide a dead bolt lock which is independent of the vehicle lock system. Embodiments are shown utilizing an electromagnetic solenoid bolt moving mechanism and a cam driven bolt moving mechanism having an electric motor drive coupled thereto.

7 Claims, 2 Drawing Sheets

VEHICLE DOOR SAFETY AND THEFT RESISTANT LOCK

FIELD OF THE INVENTION

This invention relates generally to vehicle security and anti-theft devices and particularly to door lock mechanisms used in conjunction therewith.

BACKGROUND OF THE INVENTION

With the fabrication of enclosed vehicles such as automobiles, trucks or the like, a need arose for the provision of convenient locking apparatus to secure the vehicle from unauthorized access and entry. In response to this need, practitioners in the art have developed various door lock mechanisms which typically utilize a key actuated lock carried within the vehicle door cavity which interacts with a lock plate supported upon the door jam. Such vehicle door locks are mechanically linked to an externally accessible handle and an internally accessible handle such that the vehicle operator is able to unlock the locking mechanism and using the external handle open the vehicle door. In addition, vehicles are typically configured to provide automatic unlocking of the lock mechanism in response to the manipulation of the internal door handle. Certain safety devices to prevent children from inadvertently opening the door of a vehicle in motion have been provided in the form of an override mechanism usually operated solely at the driver's position which inhibits this interior handle actuation of the door lock.

In response to continued and increased need for more secure vehicles, practitioners in the art have endeavored to provide various vehicle security systems. These security systems have included devices such as audible and visual alarms triggered by attempts at unauthorized entry to a locked vehicle as well as a variety of devices intended to inhibit or prevent the operation of the vehicle. One of the more popular types of such devices utilizes a rigid bar securable to the vehicle steering wheel which prevents turning of the wheel and thereby prevents driving and steering of the vehicle. Still other security apparatus has been provided in the form of vehicle tracking systems which are operative to assist law enforcement individuals in locating a stolen vehicle.

Despite the significant effort employed by practitioners in the art in providing such systems, several problems and limitations nonetheless persist. For example, the basic door lock mechanism provided on vehicles is relatively easy to open when attacked by a professional thief due to the multiplicity of linkage members interconnecting the external and internal door handles with the lock mechanism. A variety of simple tools are available or are fashioned by would be vehicle thieves which utilize these various linkages. Most typically, these tools comprise variously curved and bent thin members which are forced into the door interior via the window slot and thereafter moved to the required location to operate the door linkage and open the door lock. In addition, the basic structure of vehicle door locks which provides for automatic opening from the vehicle interior allows any unauthorized individual having gained access to the vehicle interior such as by breaking a window or the like to simply reach in and actuate the interior handle unlocking the door. Moreover, notwithstanding the above points of vulnerability, the conventional door lock is relatively easy to force open by prying between the door and door jam to defeat the lock.

Vehicle security and theft preventative devices of the type referred to above are also subject to several problems and limitations. For example, alarms are often ineffective due to the tendency of persons to simply ignore them once they are triggered. In addition, vehicle alarms do not of themselves prevent entry to the vehicle and thus do not protect the vehicle contents. Finally, it is well known in the art that most vehicle alarm systems are easily defeated by damaging or disabling the vehicle battery for example. Devices intended to disable the vehicle and render it undrivable are similarly open to vulnerability in that they are easily defeated and do not protect the vehicle against unauthorized entry and access to the vehicle contents. Vehicle tracking systems are similarly inadequate in that they are intended to assist in the eventual recovery of a stolen vehicle but do not prevent unauthorized access to the vehicle interior and its contents.

Thus, a situation arises in which the vehicle locking apparatus provided to a vehicle purchaser as well as so-called after-market security and anti-theft systems fail to adequately address the fundamental basic objective in vehicle security and safety systems. Namely, such systems fail to prevent the unauthorized entry to the vehicle and protection of the vehicle contents. As a result, there remains a continuing need in the art for vehicle security and safety locking systems which protect the vehicle against unauthorized entry and which more particularly prevent the vehicle doors from being opened by unauthorized users.

SUMMARY OF THE INVENTION

Accordingly, it is a general object of the present invention to provide an improved apparatus for vehicle door safety and theft resistance. It is a more particular object of the present invention to provide an improved lock apparatus for a vehicle which prevents the penetration of the vehicle by preventing the unauthorized opening of the vehicle doors.

In accordance with the present invention, there is provided for use in securing a vehicle door to a vehicle chassis, a door lock comprising: a bolt actuator having a movable bolt and means for moving the bolt between a withdrawn position and an extended position; a lock plate having an aperture for receiving a portion of the bolt in the extended position; a guide having an aperture for receiving the bolt in both the withdrawn position and the extending position; and a switch for controlling the actuator, the lock plate aperture and the guide aperture being aligned with one on a vehicle door and the other on a fixed portion of the vehicle and the bolt actuator being supported proximate the guide.

BRIEF DESCRIPTION OF THE INVENTION

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a partial section view of a typical vehicle door utilizing the present invention vehicle door lock;

FIG. 2 sets forth a partial section view of the present invention vehicle door lock;

FIG. 3 sets forth a section view of an alternate embodiment of the present invention vehicle door lock;

FIG. 4 sets forth a schematic diagram of the electrical system of the present invention vehicle door lock shown in FIG. 2; and FIG. 5 sets forth a schematic diagram of the electrical system of the present invention vehicle door lock set forth in FIG. 3.

DESCRIPTION OF THE PREFERRED EMBODIMENTS

Figure 1:
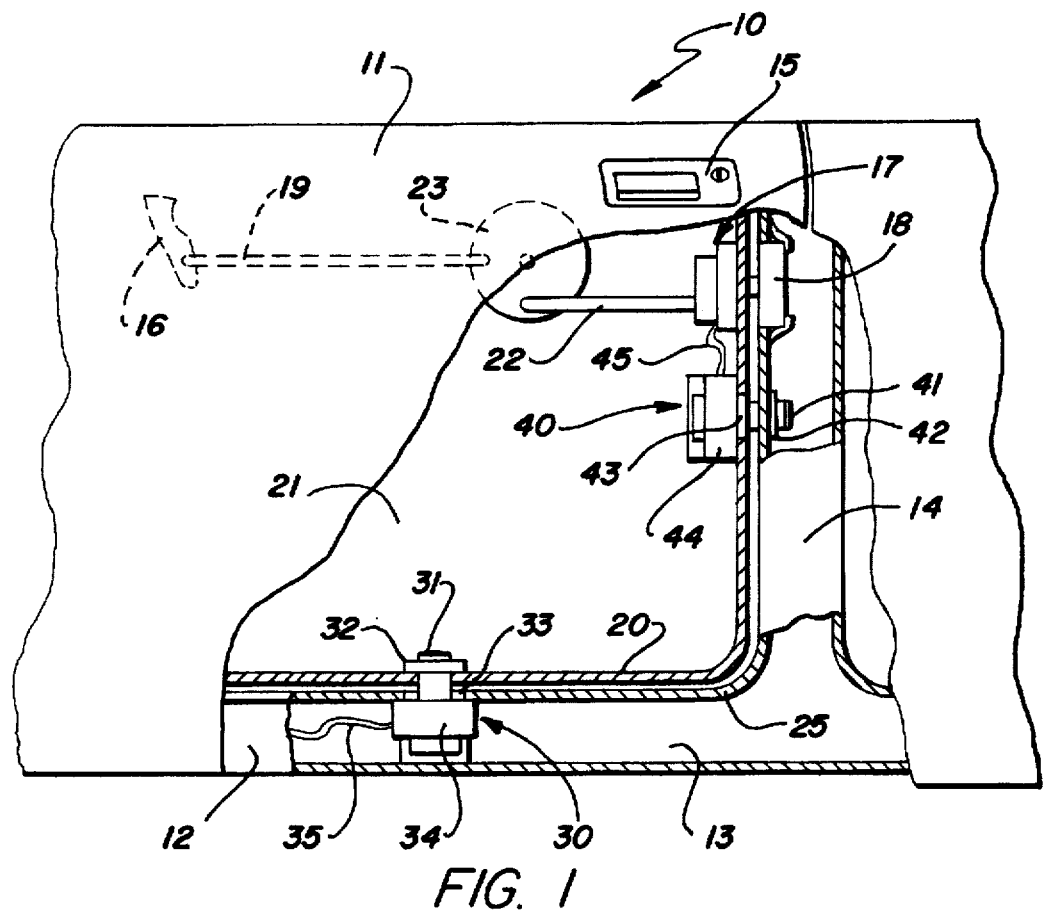

FIG. 1 sets forth a partial section view of a representative vehicle generally referenced by numeral 10 having a conventional door 11 secured thereto and operative in accordance with conventional fabrication techniques which further includes a pair of auxiliary vehicle door lock mechanisms constructed in accordance with the present invention and generally referenced by numerals 30 and 40. Thus, vehicle 10 includes a rocker panel 12 and a door jam 14 formed within the vehicle support chassis and frame. Vehicle door 11 supports an external door handle 15 as well as an internal door handle 16 secured within the vehicle interior in accordance with conventional fabrication techniques. In further accordance with conventional fabrication techniques, door 11 supports a door lock mechanism 17 operatively coupled to external handle 15 by conventional means (not shown). Door jam 14 supports a striker plate 18 aligned with door lock mechanism 17 which cooperates with door lock mechanism 17 to receive and secure a lock member in accordance with conventional fabrication techniques. In further accordance with conventional fabrication techniques, lock mechanism 17 and interior handle 16 are operatively connected by a pair of linkage arms 22 and 19 respectively via a rotational wheel actuator 23.

Thus, with the exception of auxiliary locks 30 and 40, the structure and operation of door 11 within vehicle 10 utilizing lock mechanism 17 and striker plate 18 together with external handle 15 and interior handle 16 may be entirely conventional in operation and in structure.

In accordance with the present invention, an auxiliary lock mechanism 30 is operative to further secure door 11 with respect to rocker panel 12 in the closed position shown. The mechanism of auxiliary lock 30 is set forth below in greater detail. However, suffice it to note here that a lock plate 32 defining a center aperture is secured within door wall 20 of door 11 and is aligned with a guide 33 also defining a center aperture which is secured to the upper surface of rocker panel 12. Rocker panel 12 defines an interior cavity 13 within which a bolt actuator mechanism 34 is supported and is electrically connected in the manner set forth below in FIG. 4 or, alternatively, in the manner set forth in FIG. 5 by electrical connectors 35. In further accordance with the present invention, bolt actuator 34 supports an extending dead bolt 31 which passes through the aligned apertures within guide 33 and lock plate 32 to extend into interior cavity 21 of door 11. Thus, in the locked position shown in FIG. 1, dead bolt 31 spans the intervening space between door wall 20 of door 11 and the upper surface of rocker panel 12 and there beyond. As a result, in the locked position shown, the extension of dead bolt 31 prevents the opening of door 11 despite manipulation of handle 15 or interior handle 16 in a manner opening door lock mechanism 17. Similarly, and in further accordance with the present invention, the independent operation of auxiliary lock 30 maintains the locked closure of door 11 despite the successful efforts of an intruder using well known door opening tools to manipulate the linkage mechanisms of the door lock such as linkage elements 19 or 22. Further, the door locking action provided by the extension of dead bolt 31 prevents opening of vehicle door 11 notwithstanding substantial prying forces being applied between door 11 and door jam 14 which would otherwise defeat the conventional locking action of door lock mechanism 17 and striker plate 18.

In the event the user desires to open door 11, the user operates bolt actuator 34 in the manner described below in FIGS. 4 and 5 to cause bolt actuator 34 to withdraw dead bolt 31 from lock plate 32 into guide 33 as shown below in FIGS. 2 and 3. Once dead bolt 31 has been withdrawn from lock plate 32, door 11 may be opened in the conventional manner using external handle 15 or interior handle 16.

Auxiliary lock 40 is operative in the same manner as auxiliary lock 30 and differs solely in its position within door 11. In other words, auxiliary lock 30 shows an example of the present invention vehicle door lock used in a horizontal operation to interact between the vertical wall of door 11 and door jam 14. In all other respects, the operation of auxiliary door lock 40 is substantially the same as auxiliary lock 30. Thus, auxiliary lock 40 includes a dead bolt 41 extending through an aperture formed in lock plate 42. The latter is secured to door jam 14. Further, auxiliary lock 40 includes a guide 43 aligned with lock plate 42 through which dead bolt 41 also passes. A bolt actuator 44 is secured to the interior surface of door wall 20 and supports dead bolt 41. A pair of electrical connectors 45 couple bolt actuator 44 to the operative mechanism described below which is utilized to actuate the bolt mechanism.

In operation, dead bolt 41, when extended in the manner shown in FIG. 1, passes through guide 43 and lock plate 42 into the interior of door jam 14. As a result, dead bolt 41 in the locked position shown spans the separation between door jam 14 and door wall 20 to prevent opening of door 11. With auxiliary lock 40 in the locked position shown, door 11 is similarly prevented from opening notwithstanding the above-described manipulation of door handles 15 and 16 as well as the intrusion of an intruder manipulating the various linkages within the lock mechanism. As is also described, the extension of dead bolt 41 prevents the opening of door 11 by force such as prying or the like.

It will be understood by those skilled in the art that auxiliary locks 30 and 40 are shown together in FIG. 1 to illustrate the alternative positions within which the present invention door lock may be used. It will be equally well understood by those skilled in the art that while a pair of auxiliary locks may be utilized as shown in FIG. 1, in the most likely utilization of the present invention door lock either auxiliary lock 30 or auxiliary lock 40 would be more than sufficient to prevent unauthorized entry into vehicle 10 through door 11. Thus, the primary purpose of showing both auxiliary locks 30 and 40 in FIG. 1 is to show alternative placement of the lock apparatus of the present invention. It will be further apparent to those skilled in the art that the present invention door lock may be situated at still different points within door 11 to provide the important benefits of the present invention door lock.

Figure 2:
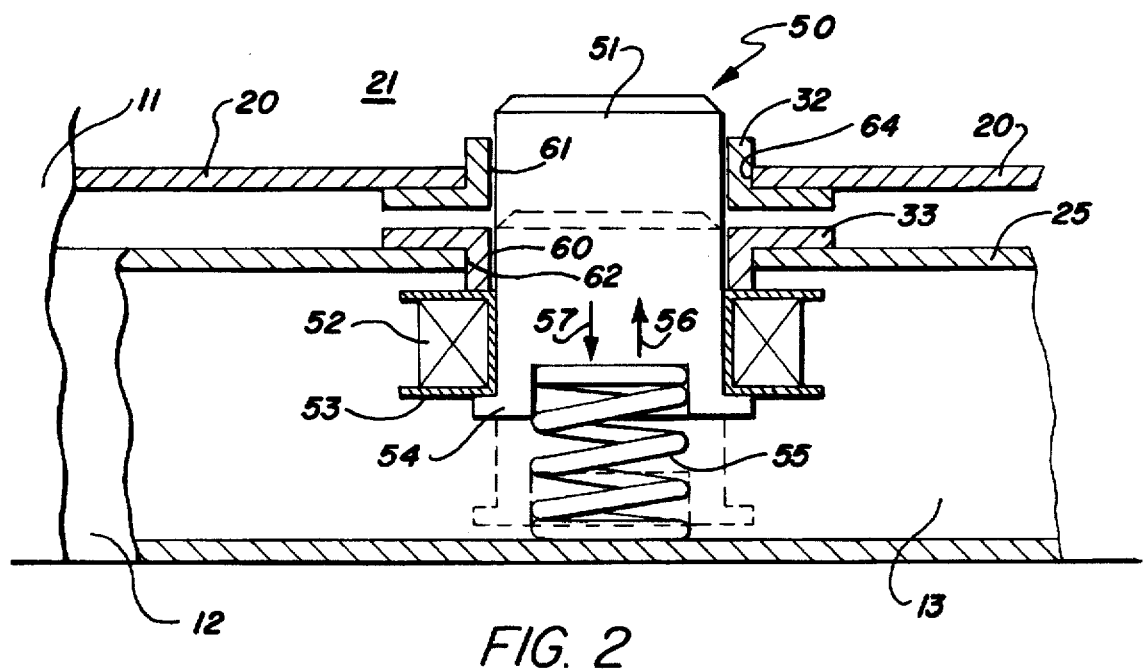
Figure 3:
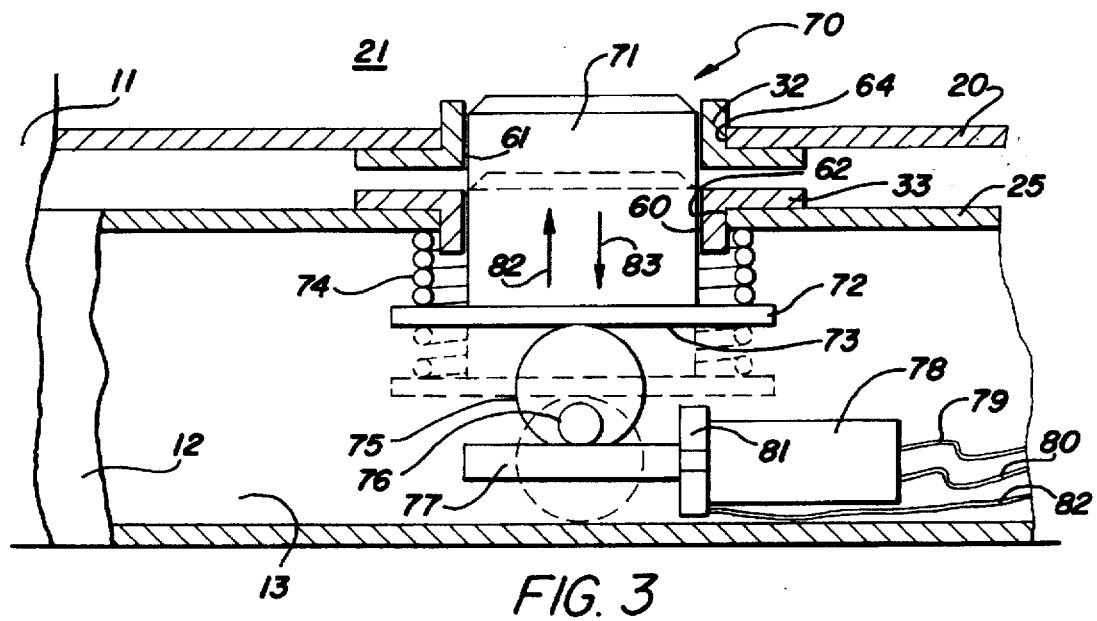

FIGS. 2 and 3 set forth alternative embodiments of the present invention door lock which illustrate a solenoid actuated mechanism and an electric motor driven mechanism respectively. It should be understood by those skilled in the art that either of the mechanisms shown in FIGS. 2 and 3 may be utilized for auxiliary locks 30 or 40 within the installation shown in FIG. 1.

More specifically and with reference primarily to FIG. 2, a door lock mechanism generally referenced by numeral 50 is shown in the closed or locked position. Door lock 50 includes an elongated dead bolt 51 having an outwardly extending lip 54 and supporting an encircling coil frame 53. The latter supports an electromagnetic solenoid coil 52 fabricated in accordance with conventional fabrication techniques. A coil spring 55 is received within an underside recess formed in dead bolt 51 and is captivated against the lower surface of rocker panel 12 within interior cavity 13. In further accordance with the present invention, upper wall 25 of rocker panel 12 defines an aperture 62 within which a guide 33 is received and secured to upper wall 25 using conventional fabrication techniques. Guide 33 defines a bore 60 through which dead bolt 51 extends. In further accordance with the present invention, door wall 20 which as is set forth above forms the lower surface of interior cavity 21 of door 11 defines an aperture 64 within which a lock plate 32 is received. Lock plate 32 defines a bore 61 aligned with bore 60 in guide 33. In the closed position shown, the force of spring 55 urges dead bolt 51 upwardly in the direction indicated by arrow 56 causing dead bolt 51 to span the space between upper wall 25 of rocker panel 12 and door wall 20. The extension of dead bolt 51 is limited by the abutment of lip 54 against the underside of coil frame 53. Dead bolt 51 is of sufficient length to extend through bore 61 of lock plate 32 and slightly beyond. Thus, in the position shown in FIG. 2, lock 50 is configured in the locked position defined by the extension of dead bolt 51 upwardly through lock plate 32.

Door lock 50 is unlocked or opened by energizing electromagnetic coil 52 producing an electromagnetic or solenoid force acting upon dead bolt 51 in the direction indicated by arrow 57. This force is sufficient to overcome the force of spring 55 and therefore drives dead bolt 51 downwardly to the dashed-line position shown. In the retracted position due to the energizing of coil 52, dead bolt 51 is withdrawn from lock plate 32 freeing door 11 and allowing door 11 to be opened.

It will be apparent to those skilled in the art that the operation of lock 50 may be reversed in that the force of spring 55 may be utilized to draw dead bolt 51 to the unlocked position shown in dashed-line representation while the solenoid force of energized coil 52 may be utilized to overcome the spring force and drive dead bolt 51 to the extended locked position shown in FIG. 2. The selection of either a normally locked or normally open operation for lock 50 is a matter of design choice and may be selected differently to suit different applications. It should be also recognized that the apparatus shown in FIG. 2 may be installed within vehicle 10 in either of a variety of positions. Thus, for example, and with temporary reference to FIG. 1, it will be apparent that lock 50 shown in FIG. 2 may be installed as shown for either auxiliary lock 30 or auxiliary lock 40 as desired. It will be further apparent to those skilled in the art that the lock mechanism shown in FIG. 2 may be supported either within interior cavity 21 or externally of door 11 such as the installation shown for auxiliary lock 30.

FIG. 3 sets forth a section view of an alternate embodiment of the present invention utilizing a door lock which may be operated in the manner indicated for auxiliary locks 30 or 40 as shown in FIG. 1. Accordingly, and with reference to FIG. 3, a door lock constructed in accordance with the present invention is generally referenced by numeral 70. Door lock 70 is installed in a similar fashion to door lock 50 set forth above in that an aperture 64 is formed in door wall 20 of door 11 which receives a lock plate 32. The latter defines a bore 61 extending therethrough. By way of further similarity, upper wall 25 of rocker panel 12 defines an aperture 62 which receives guide 33. The latter defines a bore 60 aligned with bore 61 of lock plate 32. Lock 70 includes a dead bolt 71 extending through bores 60 and 61 and defining an outwardly extending lip 72 as well as a generally planar undersurface 73. A coil spring 74 is captivated between lip 72 and upper wall 25 to provide a spring force urging dead bolt 71 downwardly in the direction indicated by arrow 83.

An eccentric cam 75 is rotatably supported upon a rotatable gear 76 beneath surface 73 of dead bolt 71. While the support of gear 76 and cam 75 is not set forth, it will be understood that cam 75 and gear 76 are rotatably supported within interior cavity 13 of rocker panel 12 in accordance with conventional fabrication techniques. A worm gear 77 cooperatively engaging gear 76 is coupled to a motor 78 through a cycle switch 81. Cycle switch 81 is constructed in accordance with conventional fabrication techniques and is operative to cause motor 78 to cycle through a predetermined number of revolutions of gear 77 causing motor 78 to alternatively position cam 75 between the solid line position shown and the dashed-line position in which the cam eccentricity extends downwardly rather than upwardly.

In operation, with cam 75 rotated to the position shown, the upward force of cam 75 against surface 73 overcomes the force of spring 74 driving dead bolt 71 upwardly in the direction indicated by arrow 82. In this position, dead bolt 71 extends through guide 32 and securely locks door 11 with respect to rocker panel 12. The position of cam 75 is maintained in the absence of energizing of motor 78 due to the single direction force coupling of worm gear 77 and gear 76. In the event the user desires to open lock 70, motor 78 is energized causing motor 78 to rotate cam 75 to the downwardly extending position shown in dashed-line. As cam 75 reaches its alternate position shown in dashed-line, cycle switch 81 operates to terminate operation of motor 78 via connection 82. With cam 75 rotated downwardly, spring 74 urges dead bolt 71 downwardly against cam 75 to the dashed-line position shown. In this position, dead bolt 71 shown in dashed-line is withdrawn completely from lock plate 32 freeing door 11 to be opened. Lock 70 may again be moved to the closed or locked position by again energizing motor 78 causing gear 77 to rotate and further causing cam 75 to return to the upwardly extended position shown— once again driving dead bolt 71 through bore 61 of lock plate 32. Thereafter, as cam 75 approaches its uppermost eccentricity, cycle switch 81 again terminates the operation of motor 78.

With temporary reference to FIG. 1, it will be apparent to those skilled in the art that lock 70 shown in FIG. 3 may be utilized in the same manner as auxiliary locks 30 and 40 as desired by the user. It will be equally apparent to those skilled in the art that lock 70 may be otherwise positioned either within interior cavity 21 or within door jam 14 or rocker panel 12 as desired.

Figure 4:
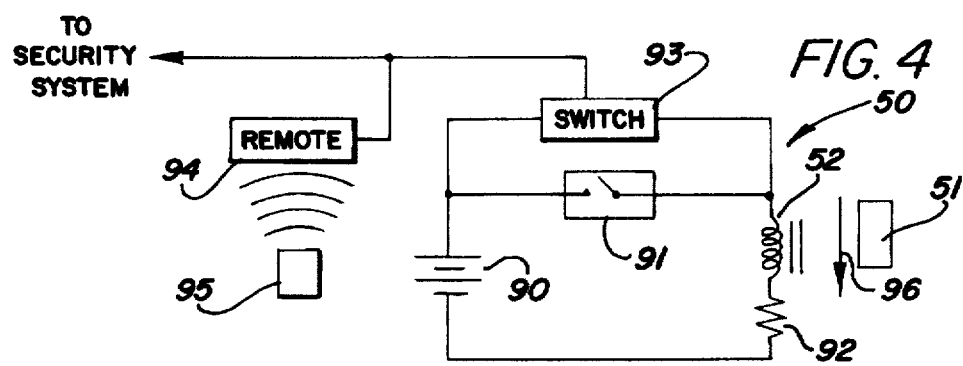

FIG. 4 sets forth a schematic block diagram of door lock 50. A battery 90 which may be the vehicle battery within which the present invention door lock is operative includes a positive terminal coupled to a solenoid coil 52 through a pair of parallel switches 91 and 93. The opposite side of solenoid coil 52 is returned to the negative side of battery 90 through a current limiting resistor 92. Switch 93 includes a switching input which is coupled to a remote signal receiver 94. The switching input of switch 93 is further coupled to the vehicle security system such as a conventional alarm system. A remote transmitter 95 is operative to energize remote receiver 94 using conventional fabrication techniques such as a radio frequency or sound transmitter. Alternatively, remote transmitter 95 and receiver 94 may utilize an optical energy coupling such as a conventional laser. The operative feature of transmitter 95 and receiver 94 is the provision for applying a trigger signal to the vehicle locking system to open the vehicle door lock. Thus, switch 93 comprises a conventional electronic switch responsive to an input signal from remote control receiver 94 to couple the positive side of battery 90 to solenoid coil 52 and energize the coil. Alternatively, coil 52 may be energized from battery 90 by closing switch 91. Switch 91 may, for example, be a conventional mechanical switch coupled to the vehicle locking system or, alternatively, a separate key switch supported upon the vehicle. Thus, solenoid coil 52 may be energized either by closure of switch 91 or, alternatively, by the operation of electronic switch 93 in response to a remote control signal from transmitter 95 which is received by remote control receiver 94. Dead bolt 52 which is moved in accordance with the energizing of electromagnetic coil 52 as shown in FIG. 2 is represented diagramatically as an elongated rectangle 51. Arrow 96 indicates the direction of movement of dead bolt 51 when coil 52 is energized.

In operation, door lock 50 is operated to move to the open position by closing switch 91. Alternatively, the user is able to transmit a remote control signal from transmitter 95 which is received by remote control receiver 94. Receiver 94 produces an output signal in accordance with conventional fabrication techniques upon recognizing transmitter 95 which is coupled to electronic switch 93. In response to the applied control signal, switch 93 closes the conductive path from battery 90 to coil 52 and energizes the electromagnetic coil. In response to coil energizing, dead bolt 51 is moved from the locked position shown in FIG. 2 in solid line representation to the open position shown in dashed-line representation therein. In the absence of the energizing of coil 52, dead bolt 51 is moved to the locking position through the action of return spring 55 (seen in FIG. 2).

Figure 5:
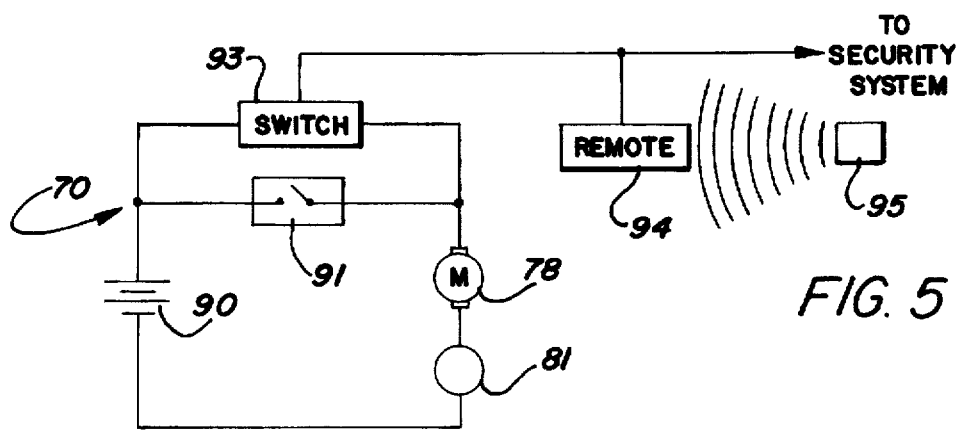

FIG. 5 sets forth a circuit diagram of door lock 70 shown in FIG. 3. In similarity to the circuit shown in FIG. 4, a battery 90 includes a positive terminal coupled to a pair of switches 91 and 93. By way of further similarity electronic switch 93 is operatively to the vehicle security system and to a remote control receiver 94. A remote control transmitter 95 which, as mentioned, may utilize either light transmission, sound transmission, or radio frequency signal transmission is operatively coupled to receiver 94 through energy transmission. A motor 78 is coupled to switches 91 and 93 and a cycle switch 81 is interposed between motor 78 and the negative terminal of battery 90.

As is described above in FIG. 3, motor 78 and cycle switch 81 cooperate to position dead bolt 71 in either a lock position or an open position each time motor 78 is energized. Thus, the user operates lock 70 by closing switch 91, for example, which energizes motor 78 and causes the above-described cycling of the position of dead bolt 71 between the fully extended locked position shown in solid line representation in FIG. 3 and the open withdrawn position shown in dashed-line representation in FIG. 3. Each time motor 78 operates, cycle switch 81 limits the cycle of operation to one-half of the complete cycle of cam 75 (seen in FIG. 3). As a result, each time motor 78 is energized, lock 70 is moved from the existing position to its alternative position. Thus, if lock 70 is open when energized, motor 78 moves the lock to the locked position. Conversely, if lock 70 is locked, motor 78 moves lock 70 to the open position. Motor 78 may also be energized by actuating electronic switch 93 which responds to an output signal from receiver 94 as the user actuates transmitter 95. Thus, each time transmitter 95 is actuated, electronic switch 93 is correspondingly actuated energizing motor 78.

With reference to FIGS. 4 and 5 concurrently, it should be noted that electronic switch 93 is indicated to be further coupled to the vehicle security system. This coupling is provided to enable the present invention door lock to be actuated in response to the vehicle security system eliminating the need for a separate transmitter and receiver. However, it has been found that a maximum degree of safety and theft protection is provided if the present invention system is completely independent of the existing security systems within the vehicle.

What has been shown is an improved vehicle door safety and theft resistant lock which is operable independent of the existing vehicle locks and security systems and which provides a mechanical lock of the vehicle door which is difficult to overcome and frustrate. The lock shown utilizes a movable dead bolt which is moved to extend between the vehicle door and adjoining support portions of the vehicle such as the rocker panel or door jam to securely lock the door in a reliable mechanical lock.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A door lock in combination with a vehicle door supported above a vehicle rocker panel and movable between an open and closed position, said door lock comprising:

a bolt actuator supported in said rocker panel;

a bolt supported by said bolt actuator and movable between a withdrawn position and an extending position;

a guide formed as a separate piece from said anchor and supported upon an upper wall of said rocker panel defining an aperture through which said bolt passes;

a lock plate supported upon said vehicle door in alignment with said guide having an aperture for receiving a portion of said bolt in said extended position; and a switch operatively coupled to said bolt actuator causing said bolt actuator to move said bolt to or from said withdrawn position.

2. A door lock as set forth in claim 1 wherein said bolt actuator includes a spring urging said bolt toward said withdrawn position.

3. A door lock as set forth in claim 2 wherein said bolt actuator includes:

a battery;

an electric motor having a drive gear;

an eccentric cam coupled to said drive gear and said bolt for moving said bolt;

a switch coupling said motor to said battery; and a cycle switch rotationally coupled to said motor and electrically coupled between said motor and said battery.

4. A door lock as set forth in claim 1 wherein said bolt actuator includes a spring urging said bolt toward said extended position.

5. A door lock as set forth in claim 4 wherein said bolt actuator includes:

a battery;

a solenoid movement operating bolt; and a switch coupling said solenoid movement to said battery.

6. A door lock as set forth in claim 5 wherein said switch includes:

a remote control receiver and transmitter; and an electronic switch responsive to said remote control receiver.

7. A door lock as set forth in claim 6 wherein said switch includes:

a remote control receiver and transmitter; and an electronic switch responsive to said remote control receiver.

* * * * *